United States Patent
Scodellaro

(10) Patent No.: US 6,575,449 B1
(45) Date of Patent: *Jun. 10, 2003

(54) PHOTOGRAPHIC MATERIAL GUIDING ARRANGEMENT

(75) Inventor: Eni Scodellaro, Gaio di Spilimbergo (IT)

(73) Assignee: Gretag Imaging, AG, Regensdorf (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 15 days.

(21) Appl. No.: 09/322,170

(22) Filed: May 28, 1999

(30) Foreign Application Priority Data

May 28, 1998 (DE) .......................... 198 23 906

(51) Int. Cl.[7] .............................. B65H 3/44; B65H 20/24
(52) U.S. Cl. .................... 271/9.07; 271/9.11; 271/9.13; 226/109
(58) Field of Search ........................ 226/109; 271/9.13; 399/391; 221/9.11, 9.07, 9.13

(56) References Cited

U.S. PATENT DOCUMENTS

| | | | |
|---|---|---|---|
| 2,856,182 A | | 10/1958 | Cantrell |
| 3,358,831 A | | 12/1967 | Cothrell |
| 3,847,319 A | * | 11/1974 | Brandon et al. ............... 225/4 |
| 3,921,878 A | * | 11/1975 | Zangenfeind ................ 226/91 |
| 4,204,620 A | * | 5/1980 | Wurfel ........................ 226/91 |
| 4,324,480 A | | 4/1982 | Nomura et al. |
| 4,548,394 A | * | 10/1985 | Koyama et al. ............ 271/9.11 |
| 4,674,734 A | * | 6/1987 | Ibuchi ............................ 271/9 |
| 4,709,913 A | * | 12/1987 | Cagey ........................ 271/207 |
| 4,843,430 A | | 6/1989 | Huber et al. |
| 4,849,792 A | | 7/1989 | Horiguchi et al. |
| 5,053,805 A | | 10/1991 | Sakai et al. |
| 5,088,722 A | * | 2/1992 | Olexy ........................ 271/304 |
| 5,227,827 A | | 7/1993 | Murakami |
| 5,281,993 A | * | 1/1994 | Crochetierre et al. .......... 355/40 |
| 5,293,797 A | * | 3/1994 | Spalding et al. ........... 83/107 X |
| 5,308,005 A | | 5/1994 | Hutteman et al. |
| 5,323,176 A | * | 6/1994 | Sugiura et al. ........... 346/25 X |
| 5,465,134 A | * | 11/1995 | Palmer et al. ............. 355/75 X |
| 5,555,066 A | | 9/1996 | Benker |
| 5,678,303 A | * | 10/1997 | Wichmann ................. 29/806 X |
| 5,992,842 A | * | 11/1999 | Dickhoff ..................... 371/9.13 |

FOREIGN PATENT DOCUMENTS

| | | |
|---|---|---|
| DE | 1 163 658 | 2/1964 |
| DE | 28 20 877 A1 | 12/1978 |
| DE | 37 13 171 C2 | 11/1988 |
| DE | 41 26 579 | 8/1992 |
| EP | 0 248 817 | 10/1987 |
| FR | 2 476 864 | 8/1981 |
| JP | 63-0318558 | 12/1988 |
| JP | 0050119461 | 5/1993 |

* cited by examiner

Primary Examiner—Donald P. Walsh
Assistant Examiner—Kenneth W Bower
(74) Attorney, Agent, or Firm—Burns, Doane, Swecker & Mathis, LLP

(57) ABSTRACT

Photographic material guide arrangements for the guidance of photographic material between at least three spaced apart photographic material guide paths along which photographic material, especially films or photographic paper, is guided, which includes the following: a selector with a receiving end for the taking up of photographic material from one end of a guide path and an output end for giving off photographic material to one end of another guide path, whereby the selector is constructed for the guiding of photographic material from the receiving end to the output end, whereby the selector is movable between different connecting positions wherein respectively at least two guide paths are connected with one another by way of the selector in order to guide photographic material from one end of a guide path to another end of a guide path through the selector, whereby with the change of the connecting position, at least one of the path ends connected by the selector changes.

11 Claims, 2 Drawing Sheets

PHOTOGRAPHIC MATERIAL GUIDING ARRANGEMENT

BACKGROUND OF THE INVENTION

1. Field of the Invention

The present invention relates to photographic material guiding arrangements for the guiding of photographic materials between sources and receivers for photographic materials which are spaced apart, according to the preamble of claim 1. The sources and receivers can be guide paths for photographic material, reel-off chambers, film cartridges, photographic material storages and other arrangements which receive or supply photographic material.

2. Background Information

The invention relates especially to a photographic material guiding arrangement which brings together photographic material that is transported along various, spaced apart guide paths to a further guide path (or a small number of guide paths) which is (are) separate from each other. The invention relates especially to a further photographic material guide arrangement which distributes or diversifies photographic material that is transported along one guide path to different guide paths spaced therefrom. In accordance with the invention, the photographic material concerned is in particular films or photographic paper or rolled up photographic material, such as rolled up film material.

The process of bringing together photographic material transported on various guide paths is known from U.S. Pat. No. 4,849,792, DE-AS 1 163 658, DE 37 13 171 A1 or DE 44 20 659. There the process concerned is to guide film material which is pulled out of various film cartridges and transported along various guide paths subsequently to a single guide path, so that the photographic material, which is in particular film material to be developed, is further transported one by one in a single guide path to be transported to a film-developing arrangement All before-mentioned methods for the guiding of film material sections from different sources to a single receiver have in common that several guide paths constantly merge into a single guide path, or are brought together in a single guide path, without them being interrupted.

This has several disadvantages. Multiple fully functional guide paths must be provided between the photographic material sources and the point of joining together. This means that for each guide path, transporting means must be provided such as, for example, driving rubber rollers or wheels which engage the lateral perforation of the films. This arrangement is difficult in particular in the joining region because of the limited space available there, above all when more than two guide paths are joined. Therefore, in the area where the guide paths are joined, additional rollers, which would guarantee a safe guiding of the film material, must be left out for reasons of space availability. This has as a result that malfunctions because of jammed film material are possible especially in the joining region.

For the above-mentioned reasons, it is preferred to always join only two guide paths. If more guide paths are to be joined, this is done spaced apart, so that first two guide paths are joined and later another two, and so on However, this increases the space requirements.

SUMMARY OF THE INVENTION

It is an object of the invention to join photographic material from different material sources reliably and with space savings to a photographic material receiver or to reliably distribute photographic material from one source to several receivers with space savings.

The object of the invention is achieved with the features of claim 1. Preferred embodiments are apparent from the dependent claims.

Advantageously, the photographic material guiding arrangement in accordance with the invention includes several mutually spaced apart sources and receivers, especially guide paths for photographic material which can be selectively connected by the selector in accordance with the invention. The selector is constructed like a guide path for the guiding of photographic material. However, in contrast to guide paths, it is movable, especially movably supported, to be shiftable between one position wherein it connects different sources and receivers to another position wherein it provides another connection between sources and receivers.

The selector in accordance with the invention thus bridges an interruption between different sources and receivers, wherein it can be selected which of the mutually spaced apart sources and receivers are to be connected by the selector.

The selector in accordance with the invention replaces the division region or combining region Known from the prior art wherein several guide paths join together in order to merge. The lack of space in the joining region is thereby avoided and a secure transport of the film material is ensured.

Several, for example, three, guide paths in accordance with the invention lead to a region wherein the selector is movably supported and one guide path leads away from the region of movement of the selector, for example, opposite to the entry region of the three guide paths. The selector is then moved in such a way that it selectively connects one of the three guide paths leading to the selector region with a guide path leading away therefrom.

The guide paths can be constructed so that they selectively supply photographic material to the selector, i.e., operate as photographic material source, or receive photographic material from the selector, i.e., function as a photographic material receiver. Preferably at least three mutually spaced-apart guide paths are provided (the number of sources and receivers is at least three).

For the formation of a connection, the selector can be constructed as a simple guide, but can also be constructed itself as a fork or split, so that, for example, two or more sources or receivers are connected together to a receptor or source by a selector in a defined connection condition, in order to connect more than one source with only one receiver in one connecting position. However, the selector is preferably constructed without split in order to avoid the above-described disadvantages of the split (lack of space).

The photographic material guidance arrangement can include several selectors, arranged, for example, in parallel or in series, in order to increase the number of the connections possible between guide paths leading to and from sources and receivers and to connect several sources with several receivers in parallel.

In order to make the selector movable, it Is preferably movably supported. For that, it can be, for example, guided on tracks, connected with a shaft, have a pivot axis and or be magnetically supported in order to provide a frictionless support as much as possible, and a fast change of positions.

Preferably, the position of the receiving and or the output end of a selector is changeable. The selector can therefore be provided, for example, with joints and/or pivotable arms. Preferably, the selector is constructed in addition or exclusively in such a way that it is completely pivotable in order to create with one pivotable movement a connection between different guide paths.

When the selector is pivotable, the selector, for example, can be rigidly connected with a pivot axis and the pivot movement created by a rotation of the pivot axis, or it is freely pivotal around the pivot axis and the pivot movement is achieved by way of a further actuator element, for example, a solenoid.

The selector can also be supported to pivot around several pivot axes in order to so achieve the highest flexibility possible. Especially, the selector can be constructed such that it engages with its receiving and/or its output end with a respectively opposite path and forms a reliable connection (for example, snaps together).

The guide paths are preferably constructed such that the distance between the guide paths to be connected by way of the selector (sources/receivers) is constant. Alternatively, however, the distance between the receiving end and the output end of the selector can be adjustable. The selector is thereby constructed, for example, extendable or expandable. It can therefore, for example, have a telescopic construction or fold-out guide paths or guide arms which are provided with joints. As mentioned above, the selector can also be forked with branches of different length, whereby each branch end is constructed, for example, as receiving end, but has a different distance from and position in relation to the output end.

The space gained by use of the selector, compared to the switch-type joining of several guide paths to one guide path, can be used to provide transporting means at the selector or at the sources or receivers. The transport means are used for the active transporting of the film material present in the selector. Alternatively, the selector can, of course, be used as a simple passive guide for film material.

Especially, the selector can be provided at its receiving end with an active transporting means in order to actively grab photographic material which is offered to it by a source. Several transporting means can thereby be saved compared to the prior art which otherwise would have to be provided at each individual source. Correspondingly, the selector can be provided at its output end with a transporting means.

Exactly in the joining region which was critical in the prior art because of the limited space and could only be provided to a limited extent with active transporting means, active transporting means can be provided at the corresponding selector end and/or at the opposite end of the guide path (source/receiver), in order to ensure the targeted transition between guide path (source/receiver) and selector (in both directions). The active transporting means grab the photographic material preferably by way of interlocking, force and/or friction contact. For example, as known in the prior art, rubber rollers or wheels engaging the perforation can be used. The transporting means are thereby preferably constructed so that they can grab the photographic material in the transition region in each orientation of the selector.

The transporting means is therefore preferably constructed so that, if a change in direction of the guide of the transported film material is required, the contact time of the film material with the transporting means is increased or the contact distance increased, in the transition region between selector and guide path (source/receiver), in order to so reliably carry out the required change In direction.

Due to the space available, contrary to the prior art, it is also possible to construct the active transporting means in such a way that they are changeable in their position and/or orientation so that they transport in different directions depending on the connecting position.

Alternatively or additionally, that end of the guide path (source/receiver), which is opposite the selector, can also be movably constructed to adapt its orientation to that of the selector to ensure a continuous transition between selector and source/receiver. To that end, for example, the end of the guide path can be flexibly constructed, for example, by constructing it of individual mutually pivotable ribs, in order to give the end of the guide path a desired curve or straight shape.

Alternatively or additionally, the receiving end of a receiver (or a selector) can be expanded in cross section, similar to a funnel, in order to respectively, safely receive film material output by the selector (or from the source), even when it is received from different directions, depending on the selector position.

Alternatively or additionally, the receiving and/or output end of the selector can be constructed so that its orientation is adjustable, so as to be adapted, depending on the selector position, always to the orientation of the opposite guide path. The end of the selector can thereby be made, for example, from chain-linked ribs or flexible materials.

The photographic material guide arrangement is preferably provided with a control arrangement for the control of the connecting position of the selector (or of several selectors). The largest possible diversity of connections between mutually spaced photographic material guide paths (sources/receivers) can thereby be achieved. If, for example, a number of guide paths lead into a circular selector region, so that a connection between different guide paths can be produced by simple rotation of the selector around the center of the circular area. When a selector is made of two portions which are connected by a pivotable joint, each guide path can be connected with each other. The respective connecting position of the selector is thereby determined by the control arrangement.

As already mentioned, solenoids, motors or other drive or actuator means, even of hydraulic type, can be used for moving the selector.

Preferably, a photographic material guide arrangement in accordance with the invention is constructed such that a number of guide paths (sources/receivers) lead to a selector region wherein the selector is positioned (or lead away therefrom) and one guide path (receiver/source) leads away from the selector region (or leads thereto). If in this case photographic material is to be transported on all guide paths and an overlapping or running together of different photographic materials in a single guide path is to be avoided, in order the avoid build-ups and mutual damage of the film material, a time-dependent control of the photographic material transport is required. If more sources are present than receivers, the selector and the transport of the photographic material is controlled so that the photographic material sections are guided sequentially, one source at a time to a receiver (or a smaller number of receivers). In the opposite direction, photographic material sections are distributed by the selector from one source (or a smaller number of sources) to a larger number of receivers and sequentially one receiver at a time.

It is an advantage of the photographic material guide arrangement in accordance with the invention over and above the prior art that, because of the use of the movable selector, always only one active bridging occurs at any point in time between one source and one receiver. In the prior art, however, several guide paths merge at one point, whereby a transport is possible simultaneously on all guide paths Therefore, in accordance with the invention, by way of the use of the selector, a collision of photographic material derived from different guide paths is avoided with this specific construction.

When several photographic material sources are present, for example, several reel-off chambers for film cartridges, a preferably cyclical connection is created between a selector and sequentially with each photo chamber. The operator thereby has always sufficient time to exchange the cartridges in the reel-off chambers, when the reel-off chambers are just not connected with the selector.

The whole arrangement is thereby preferably light impermeable. In order to render the photographic material transport region light proof relative to the reel-off chambers during the exchange of a film cartridge, sealing means are preferably provided, for example, a flap. In accordance with the invention, the selector can be constructed so that it opens the seal means (the flap) when it is brought into connecting position with a reel-off chamber (and the guide path possibly included therein). When it is mooed away again from the connecting position, the selector preferably automatically closes the sealing means or the flap.

Where the distance between the receiver to which the reel-off film material respectively is to be guided, and the reel-off chambers varies, either the selector is constructed to be of variable length, as described above, or the guide path in the reel-off chamber is extended, or alternatively, a guide path section is added outside the reel-off chamber, if required, or the position of the reel-off chamber is fittingly selected.

In the prior art, the cutting knives for the severing of the rolled up film material is positioned in the reel-off chambers. In accordance with the invention the selector can also be provided with a cutting knife, so that the respective cutting knives in the individual reel-off chambers can be saved. The selector also can pull the film material directly out of the reel-off chamber by way of a gripping arrangement, or receive the film material reeled out of the reel-off chamber without a separate guide path or a separate transport arrangement being present between the film cartridge and the selector.

The photographic material sources or photographic material receivers in accordance with the invention are, for example, photographic material storage arrangements, for example, photographic material buffers or photographic material storages, but also the described guide paths, which give off or receive the photographic material. The photographic material sources and the photographic material receivers can thereby be constructed so that they, as is the case with a storage or a guide path, can function both as a receiver and as a source.

In accordance with the invention, the control arrangement can be constructed so that it detects and processes information applied to the film material or the associated leader carts, and then uses it for the control of the selector or selectors. In this way, depending on the film type or the wishes of the client, the films or individual film sections can be guided in a controlled manner to different processing stations, in order to be subjected there to a respectively different processing according to the detected information. The selector can therefore, for example, also be provided with a detecting arrangement to detect, for example, the information on the leader cart. Depending on whether the film material associated with the leader cart is considered by the control arrangement to be suited for further processing or not suited, the film material is then pulled by the selector from the source, or a further source is tested by way of the selector.

The photographic material guide arrangement in accordance with the invention can also be used for sorting, for example, to sort out certain photo portions which are underexposed or overexposed and to subject them, for example, to a special processing or to completely sort them out.

In accordance with the invention, sensors are preferably used to supervise the transport of the photographic material from the photographic material sources or to the photographic material receivers (to and fro the guide paths). It is thereby possible to carry out the position change of the selector with precise timing. This means that, for example, when the photographic material from one source ends, the selector is moved to the next source in order to receive from there new photographic material.

A certain spacing is achieved between the photographic material sections by movement of the selector from one connecting position to the next, when they are to be guided together to one guide path or to one photographic material receiver. If it is desired to minimize this gap, the gap can be closed by the supervision through the sensors and by a short term transport speed increase. The transport speed increase is achieved by operation of one photographic material transporting means by way of the control arrangement which is controlled to transport the photographic material at a higher speed.

The distribution of photographic material from different sources to different receivers by way of the photographic material guide arrangement in accordance with the invention can be constructed more flexible when photographic material storages or photographic material buffers are provided at the guide paths, which receive and supply photographic material. For example, delays in the photographic material transport due to the change in connecting position of the selector can be evened out thereby.

BRIEF DESCRIPTION OF THE DRAWINGS

Further preferred features of the invention are apparent from the following description of exemplary embodiments, with reference to the Figures. Preferred features of different embodiments can be combined with each other.

DETAILED DESCRIPTION OF THE PREFERRED EMBODIMENTS

Figure 1A:
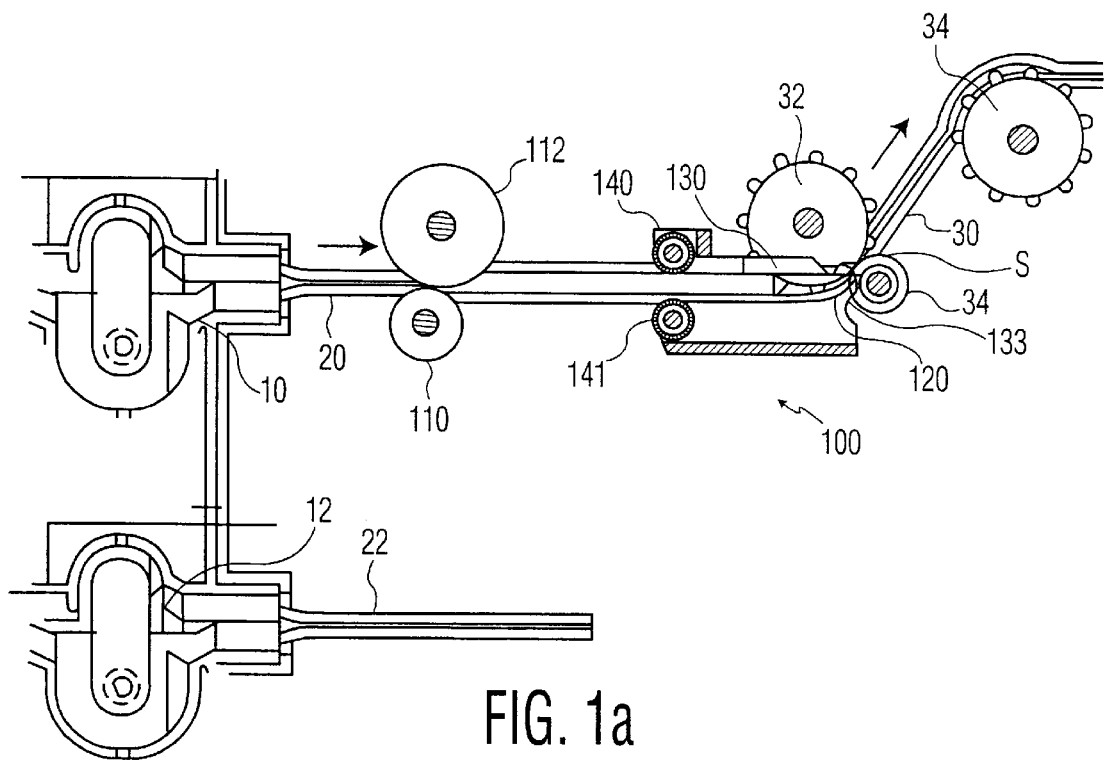
FIG. 1A shows a first connecting position of a first embodiment of a photo material guide arrangement in accordance with the invention.
Figure 1B:
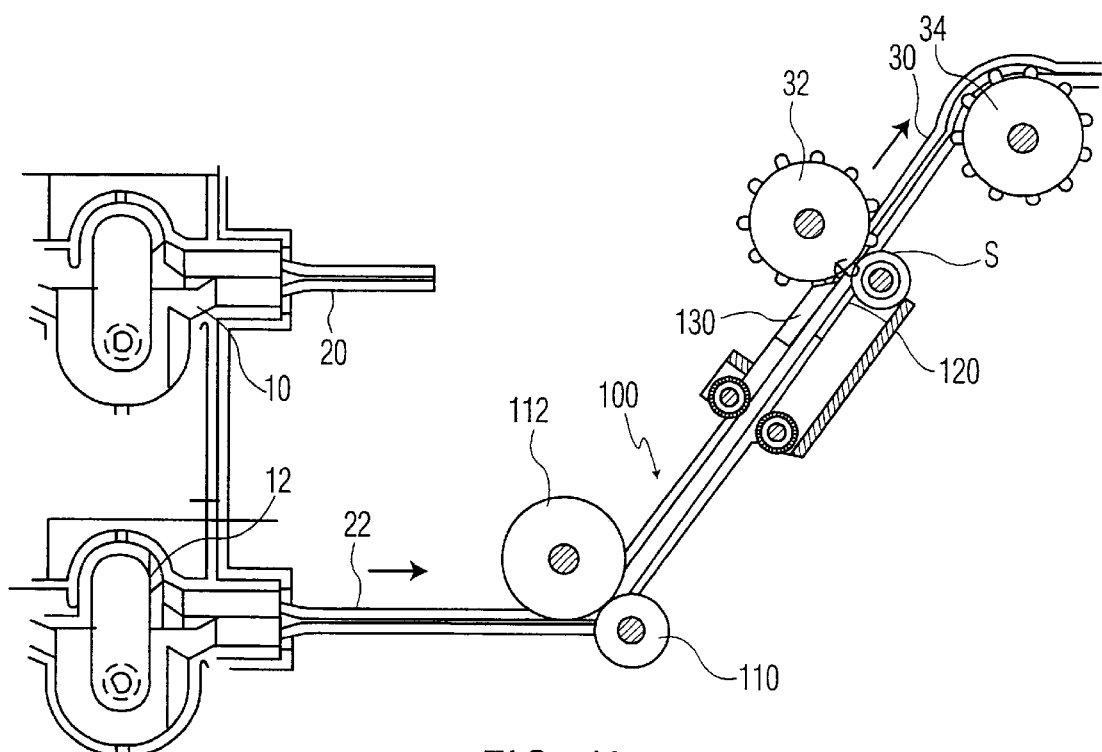
FIG. 1B shows a second connecting position of the first embodiment of the photographic material guide arrangement in accordance with the invention.

FIGS. 1A and 1B schematically show reel-off chambers 10 and 12 in which film cartridges can be positioned. The selector is designated 100 with 20, 22 and 30 referring to guide path sections. In the position of FIG. 1A, the selector connects the guide path section 20, with the guide path section 30. In the connecting position which is illustrated in FIG. 1B, the selector connects the guide path section 22 with the guide path section 30. The selector includes at one end gripping rollers 110 and 112 which are, for example, constructed as rubber rollers. These rollers can be actively driven to take up or supply photographic material.

In the transition region into the guide path 30, the selector is formed as a channel with the side walls 120 and 130. The reference numbers 140 and 141 refer to nondriven rollers which also form part of the selector. The wheel 32 serves the transport of film material by engaging the perforation of the film material. It is stationary positioned at the guide path 30. Opposite the wheel 32, a nondriven roller 34 is provided at the guide path 30. The selector 100 is provided at 132 with an indentation 133 which surrounds part of the axis of roller 34 in the second connecting position.

The side wall 120 is curved at its end directed towards the guide path 30 so that in the first connecting position (FIG. 1A) the guide of the photographic material at the end of the selector is registered with the guide path 30. The straight construction of the side wall 120 provides even in the second connecting position, a continuous transition of the photographic material from the selector to the guide path.

For the further transport of the film material, an additional wheel 34 is provided.

Figure 2A:
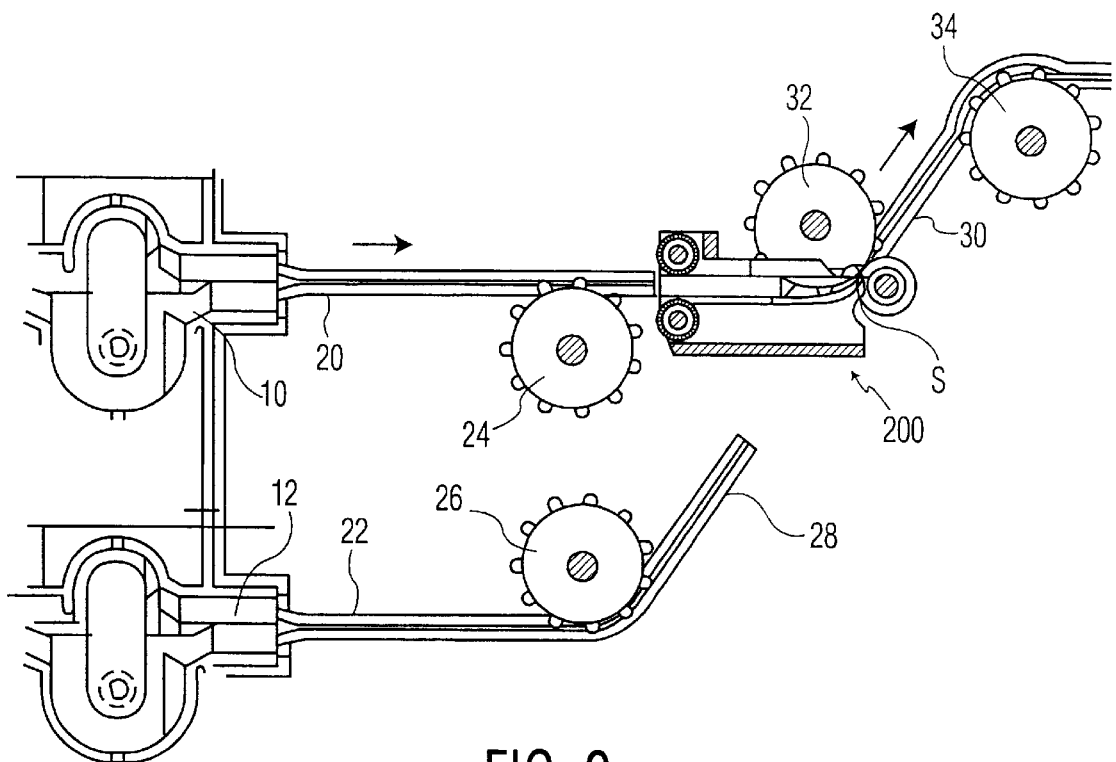
FIG. 2A shows a first connecting position of a second embodiment of a photographic material guide arrangement in accordance with the invention.
Figure 2B:
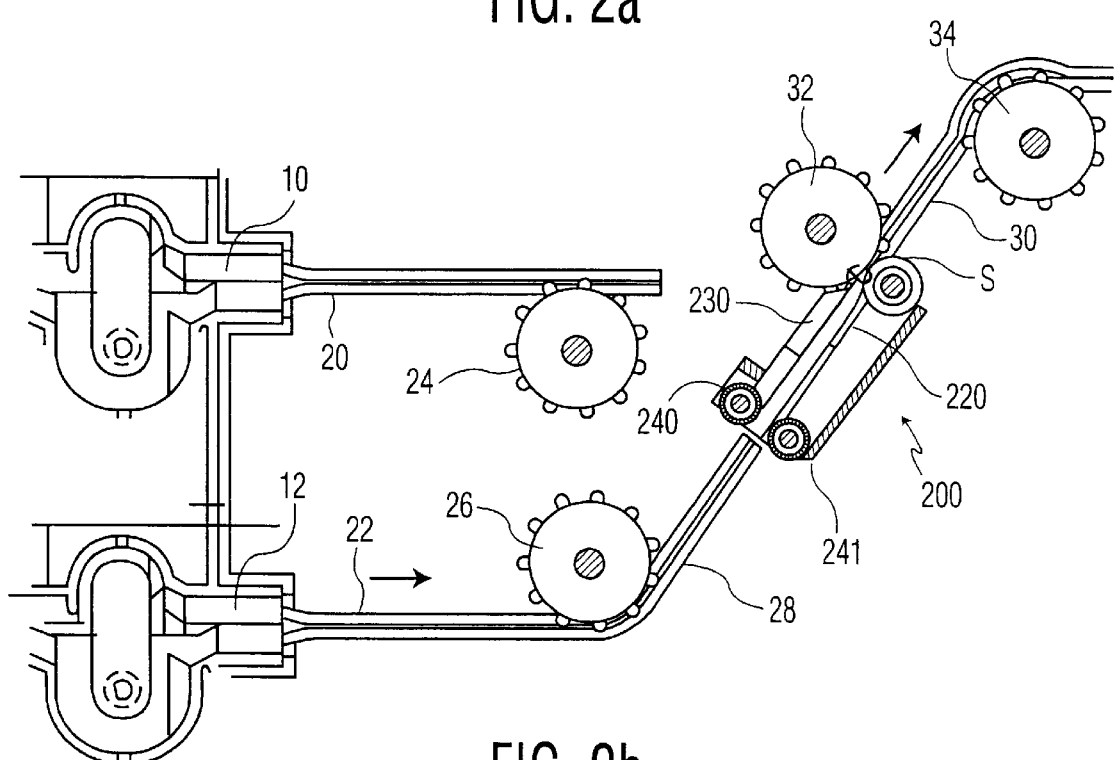
FIG. 2B shows a second connecting position of the first embodiment of the photographic material guide arrangement in accordance with the invention.

FIGS. 2A and 2B show a second embodiment of a photographic material guide arrangement in accordance with the invention. The selector 200 is in that case constructed shorter, but also includes the guide walls 230 and 220 as well as the nondriven rollers 240 and 241. The guide channel 22 is extended contrary to the embodiment 1 and extends through a curve so that the section 28 of the guide channel 22 which is opposite the guide channel 30 is registered therewith. Wheels 24 and 26 are respectively provided at the guide channels 20 and 22 for the film transport. Since in each position a continuous direction transition between the guide channel 20 or 28 and the selector 200 is guaranteed, gripping rollers 112 and 110 have been left out. Nevertheless, actively driven gripping rollers can be provided, for example, instead of the nondriven rollers 240 and 241.

The pivot axis around which the selector is pivoted is designed in the Figures with S. An additional supporting construction (not illustrated) can be provided for the connection of the selector with the pivot axis.

What is claimed is:

1. Photographic material guide arrangement for the guiding of photographic material from at least one photographic material source to at least one photographic material receiver, said arrangement comprising:

a selector having a receiving end for taking up photographic material from said at least one photographic material source; and an output end for giving off photographic material to said at least one photographic material receiver, whereby the selector is constructed for the guidance of the photographic material from the receiving end to the output end, wherein the selector is movable between a plurality of different connecting positions, in which photographic material from said at least one photographic material source is guided to said at least one photographic material receiver with the help of the selector, with changes among said connecting positions changing which of said at least one of the sources and receivers participate in a connection, and wherein at least one photographic material storage is constructed as a reel-off chamber for receiving a film cartridge and for giving off unrolled film material from the film cartridge which is to be guided to the selector.

2. Photographic material guide arrangement according to claim 1, wherein the selector is pivotable from one of said plurality of connecting positions to another of said plurality of connecting positions.

3. Photographic material guide arrangement according to claim 1, wherein the distance between the receiving end and the output end of the selector is changeable.

4. Photographic material guide arrangement according to claim 1, wherein the selector further comprises:

a photographic material transporting means, for actively transporting the photographic material that has been guided through the selector.

5. Photographic material guide arrangement according to claim 1, wherein the selector is provided at the receiving end with an arrangement for receiving the photographic material by at least one of shape, filling force and friction engagement.

6. Photographic material guide arrangement according to claim 1, wherein the photographic material storage is a buffer, and wherein at least one source connectable with the selector is connected with the buffer.

7. Photographic material guide arrangement according to claim 1, wherein the selector is provided at the output end with an arrangement for supplying the photographic material by at least one of shape, filling force and friction engagement.

8. Photographic material guide arrangement according to claim 1 wherein a control arrangement controls the photographic material transport in the guide arrangement and a change in the position of the selector in order to sequentially distribute photographic material sections from one source to different receivers.

9. Photographic material guide arrangement according to claim 1, wherein a control arrangement controls the photographic material transport in the guide arrangement and a change in the position of the selector in order to sequentially guide photographic material sections from different sources to one receiver.

10. Photographic material guide arrangement according to claim 9, wherein sensors are provided for the supervision of at least one of photographic material transport, selector position, and selector movement, and sensor signals are provided to the control arrangement for control.

11. Photographic material guide arrangement according to claim 9, wherein the control is carried out such that during the bringing together of photographic material sections the spacing between the photographic material sections is minimized.

* * * * *